United States Patent Office 2,897,380
Patented July 28, 1959

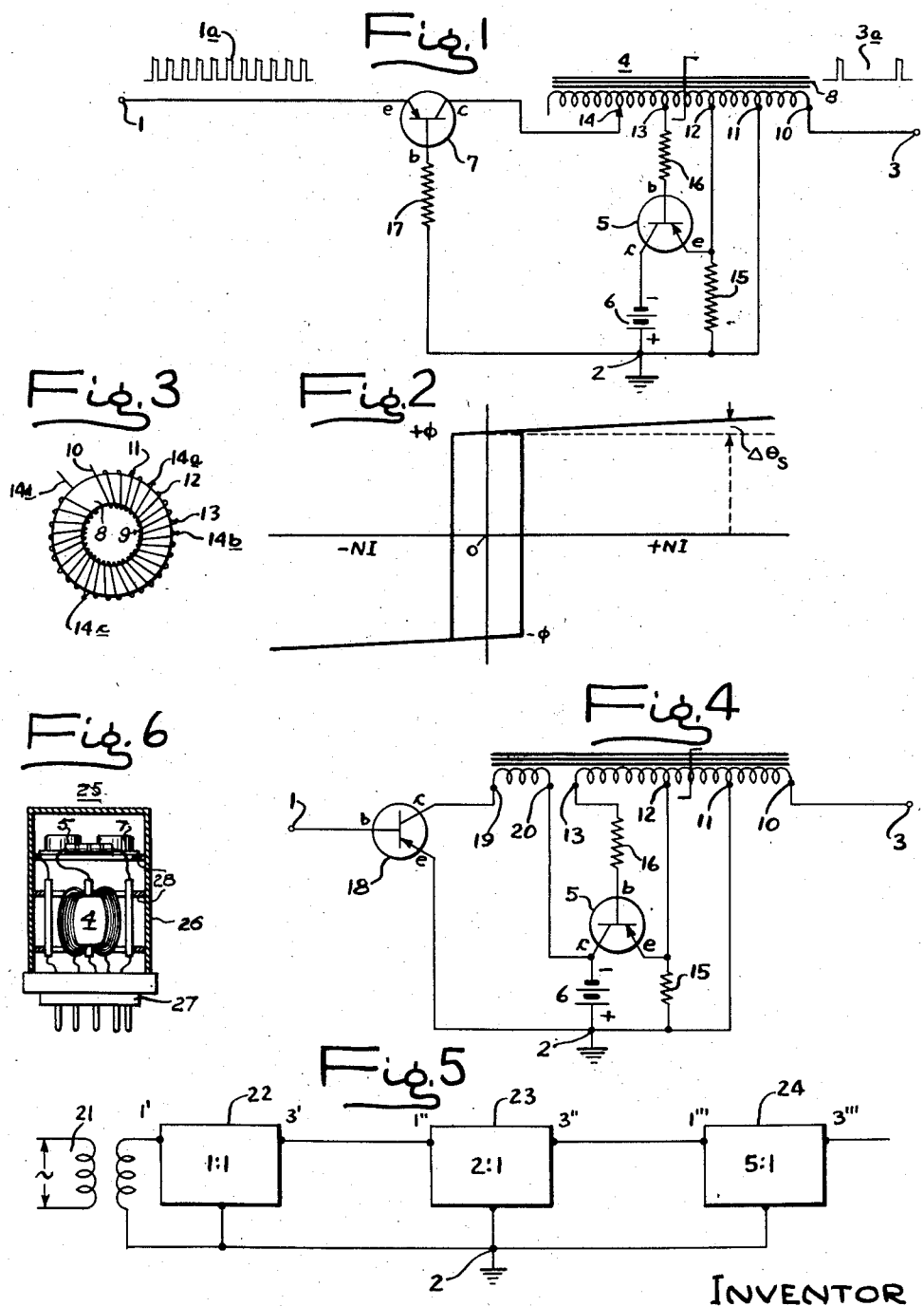

2,897,380

MAGNETIC PULSE COUNTING AND FORMING CIRCUITS

Carl Neitzert, Chatham Township, Morris County, N.J., assignor to General Time Corporation, New York, N.Y., a corporation of Delaware Application September 19, 1957, Serial No. 684,888

11 Claims. (Cl. 307—106)

This invention relates to circuits for counting and forming electrical impulses.

Versatile apparatus of a type generally known as electrical pulse counting circuits can be useful in a number of ways, for example, as frequency dividers, as interval timers utilizing the count of a number of impulses of a given frequency, or as preset repeating counters or integrators for random or periodic pulses. Such circuits, normally used for sequential or repetitive operations, form an output pulse after receipt of a certain number of input pulses as an indication of the completion of each counting, timing, or frequency dividing step. Saturable core reactors or transformers, while requiring resetting apparatus for repeated operations, have otherwise promised simplicity and long life as substitute volt-second integrating devices for the bistable multi-vibrators and capacitor charging and discharging circuits sometimes employed in the prior counter art.

It is a primary object of my invention to provide improved counting circuits utilizing automatically reset saturable core devices. Specific objectives of the improved circuits are simplicity, compactness, long life, and economy in construction and operation. Further objects are to decrease power supply requirements, both by minimizing the effect of supply voltage variations and by avoiding the consumption of stand-by power.

Another principal object of the invention is to provide saturable core pulse forming and counting stages of increased flexibility and versatility. In this respect, it is one object to form output pulses of uniform volt-second content. Another is to make such an apparatus having a readily adjustable ratio of input to output pulses over a large range, starting at unity. Another is that the circuit select pulses of only one polarity. Still another is to provide such devices in a form making them simple and convenient to operate in cascade without undesired reaction or added isolating means.

It is likewise an object to provide the method as well as the apparatus for so forming and counting pulses. Other objects and advantages of the invention will appear from the following description taken with the accompanying drawings in which:

Figure 1 is a circuit diagram of a pulse counting and forming circuit incorporating my invention;

Figure 2 is a plot of flux versus ampere turns for the generally rectangular hysteresis loop core material employed in the saturable core device of Figure 1;

Figure 3 is a semi-schematic illustration of a toroidal core and tapped winding of the saturable core device represented in the circuit diagram of Figure 1;

Figure 4 is a modification of the circuit of Figure 1;

Figure 5A:
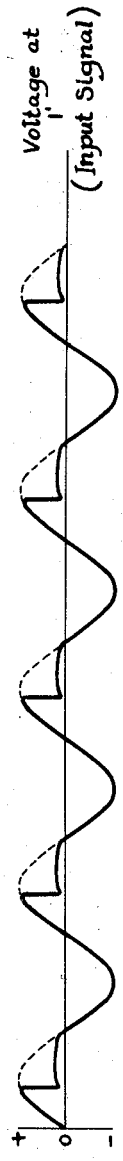
Figure 5 is a block diagram illustrating the cascade connection of three counter circuits in accordance with my invention.

Figures 5a, 5b, 5c, and 5d illustrate respectively an initial input voltage and the voltage pulses formed at the output terminals of each of three cascaded counter stages of Figure $5_1$; and Figure 6 is a perspective view illustrating the mechanical arrangement of a counter circuit stage incorporating the invention.

While the invention is susceptible of various modifications and alternative constructions, there is shown in the drawings and will herein be described in detail certain preferred embodiments. It is to be understood that it is not thereby intended to limit the invention to the particular forms disclosed, but it is on the other hand intended to cover all modifications, equivalents, and alternative constructions falling within the spirit and scope of the invention as expressed in the appended claims.

Turning now to Figure 1 the counter circuit shown therein has pulse input terminals 1 and 2, and pulse output terminals 3 and 2. Terminal 2 is conveniently a common bus or ground connection, no isolating means being required between input and output. An input train of pulses 1a and an output train 3a illustrate as an example a 5-count adjustment in which, after the receipt of five pulses of given content, an output pulse is formed. The input and output pulses are both shown as positive-going with respect to ground, and the arrangement of the circuit elements has been so selected and described. The pulses could also be negative-going, this being a matter of choice and not of limitation.

The circuit about to be described includes as major elements a saturable reactor device 4, a resetting switch 5, and a resetting power source 6, together with an input or interstage buffer device 7.

While the properties of saturable core devices as such are generally well known, a brief description here will be helpful to the reader in selecting or designing saturable core devices to meet particular needs as well as in understanding the particular circuit construction departures here involved and their significance in the operation of the circuit. Accordingly, the core 8 of the reactor, as designed for saturation within the normal operating current range, is suitably a continuous toroid of spiral-wound thin tape of the core material. The core material is characterized by its generally rectangular hysteresis loop and high retentivity. A given volt-seconds excitation product per turn of winding is required to drive the core from its negative residual flux to its positive saturation level or from positive residual flux to the negative saturation level. Retention of the core flux in the intervals between applied pulses before the volt-seconds product is attained permits step-by-step integration of the volt-seconds product. Many core materials are presently used for such purpose, among them being nickle-iron or nickle-iron-molybdenum alloys.

Figure 2 illustrates the generally rectangular hysteresis loop of such materials, but it will be noted that the curve departs from the unattained strictly rectangular "ideal." Instead, as shown in Figure 2, the core can be driven beyond the knee of the initial saturation level by a value $\Delta\phi s$ due to the saturation ampere turns. The core flux drops by an amount near $\Delta\phi s$ when the saturation current ceases. This flux excursion beyond the hysteresis loop level is usually small since the load impedance drops to a level which may be much lower than that of the excitation voltage source and a change of current rather than merely a volt-second integration is required to produce a flux change. This flux excursion beyond the loop level also involves a small hysteresis effect but this is not of consequence. But while the saturation flux increment is only a small part of the total flux change from saturation in one direction to saturation in the other, it is a departure from the "ideal" which is turned to particular advantage in accordance with my invention. It will be appreciated that if care is taken to drive the core substantially beyond the knee of the curve, the flux drop when the excitation is removed is not negligible and may be many times the corresponding flux drop when the core has not been driven beyond the vertical portion of the magnetization curve of Fig. 2. In describing the loop or characteristic as that of the core herein, it is not intended to refer to any especially refined measurements for isolating the characteristic of the core alloy material from that of the effective core of practical reactors in which air paths enclosed or linked by the winding turn may contribute to the sloping characteristic component.

A winding 9 on the toroidal core 8 is preferably provided as a continuous winding having taps or terminals (the terms are interchangeable as here employed) brought out for external connection. Starting the winding with tap 10 as the output terminal 3 and continuing at successive groups of turns along the core are taps 11, 12, 13 and 14. Tap 14 is shown in Figure 1 as variable, and physically this is most easily realized by providing a plurality of taps indicated as 14a through 14d in Figure 3.

Leaving for the moment the operation of the device 7 the application of the pulse voltage 1a between tap 11, which is connected to ground and tap 14, provides a positive magnetizing current flow through the coil turns to ground. The number of these turns between taps 11 and 14 is selected as the input winding for a given core to drive the core from negative to positive saturation in a volt-second product corresponding to the integration of a selected number of uniform input pulses. With the count of 5:1 as an example, four and a fraction input pulses are required to drive the core flux from $-\phi$ to $+\phi$ (referring here to Figure 2). During the remainder of the fifth pulse after saturation the current flow sharply increases from the relatively low magnetizing current to a high saturation current to slightly increase the core flux by an amount $\Delta\phi s$. At the end of the fifth pulse after saturation the current drops to zero the flux abruptly decreases by the small amount $\Delta\phi s$, inducing a negative pulse which is utilized to operate the resetting switch 5. The automatic resetting switch, which is utilized in a blocking oscillator type of relaxation oscillator circuit as will be described, is preferably a junction transistor having the usual emitter, base, and collector electrodes $e$, $b$, and $c$, respectively, and in this case is polarized P–N–P. It functions as a simple switch in which current flows from the emitter to the collector when the base is biased to be more negative than either the emitter or collector, and in which no current flows when the base is both more positive than the emitter and more positive than or at the same potential as the collector. During the essentially short-circuit or saturation current flow when the base is negatively biased the emitter-collector drop is negligible and variations in the control or bias voltage amplitude, so long as it is sufficiently negative, have no appreciable effect on the current flow. Such a transistor blocking oscillator or switch connection, like its amplifier counterpart, may be termed a base-input or common-emitter circuit, the emitter being common to an input control circuit and an output resetting circuit.

As shown in Figure 1 the emitter and collector electrodes of the transistor 5 are connected as switch terminals in series with a resetting voltage source 6, suitably a low voltage battery between taps 11 (common or ground terminal) and 12 of the winding. The battery is connected to bias the collector electrode negatively with respect to the ground or common terminal 2. A damping resistor 15 across the resetting turns of the winding attenuates the small voltages induced when the magnetizing current drops off rapidly at the end of an intermediate pulse of the count because of the departure of the core characteristic from the rectangular "ideal." The base electrode of the transistor is connected as the switch control electrode, preferably through a current-limiting and temperature-compensating resistor 16 to tap 13 of the winding. During the counting period when the positive magnetizing current flows to ground, tap 13 is more positive than emitter tap 12 or collector tap 11, thus blocking the flow of resetting current through the emitter-collector junction. It will be appreciated upon analysis that after the magnetizing current of an intermediate pulse has terminated and before the beginning of another pulse, the only voltage is that of the battery 6, which maintains the collector electrode positive with respect to the base so that (since there is also no potential between the emitter and base) the emitter-collector junction remains blocked to current flow.

The automatic operation of the resetting switch 5 to start and stop the flow of resetting current follows the saturation current flow during the last pulse of the counted train. A voltage is induced upon termination of the saturation current due to the small flux decrease ($\Delta\phi s$) involved, and the collector and emitter coil taps 11 and 12 momentarily become positive with respect to tap 13. With the base more negative than the emitter, the transistor is switched on and current from the source 6 flows through the resetting turns of the winding in the reverse (i.e., opposite to the input magnetizing current) direction. The large current flow through the resetting turns between taps 11 and 12 is sufficient at the selected value of resetting voltage to saturate the core in the reverse direction before the application of the next positive pulse of the input train.

The linkage of other turns of the winding with the resetting flux change as the core is driven from its positive to its negative saturation value is used both to terminate the resetting current and form an output pulse. Thus during the resetting current flow, the voltage induced across the turns maintains transistor base tap 13 negative with respect to emitter tap 12, keeping the transistor 5 switched on. However, when the core is driven to negative saturation, the voltage across the windings approaches zero and the current starts to decrease. The induced voltage produced by the decreasing current biases the base electrode positive, thus aiding the drop in current. The action is thus entirely automatic and the resetting current flow is cut off immediately after, but only after the core has been driven from positive to negative saturation, thus restoring the core to the proper predetermined condition for magnetization by the next train of received pulses.

During the resetting action, the output pulse voltage, appearing across terminals 10 and 11 having the output winding turns between them, is induced by the core flux excursion. This section of the winding thus acts as a secondary winding of the transformer whose primary winding is the resetting turns. The induced voltage appearing at terminal 3 is positive-going with respect to ground since the resetting current flows from tap 11 to tap 12. Increases in the core flux during each input pulse prior to saturation also induce a voltage in the windings. Because the direction of flux change is towards positive saturation, the pulses appearing in the output winding are negative-going, and do not interfere with the counting operation as will be seen. The very small flux change when the intermediate pulses terminate are too small to be of any consequence either as output pulses or in triggering the switch 5 into conduction. This follows from the fact that a much lesser flux change is involved than at the end of the last pulse in the count when the core has been driven substantially beyond the knee or positive saturation level of the loop and the induced voltage is large enough, despite the damping resistor 16, to initiate and sustain conduction of the blocking oscillator switch.

A further feature of the counting stage of Figure 1 is the isolation of successive counter stages by a simple input or interstage buffer device 7 shown in Figure 1 as a P–N–P junction transistor which operates at saturation with its emitter $c$ and collector $e$ as switch terminals. As shown, the buffer transistor 7 is preferably connected to the input side of the stage with its emitter connected to the input terminal 1 and its collector connected to the end tap or terminal 14 of the primary winding. It thus passes positive-going pulses whenever the base is more negative than either the emitter or the collector. This is, of course, the case when a positive pulse is applied to the terminal 1 since the base electrode is connected to the common or ground terminal 2 through a current-limiting resistor 17. Negative excursions of the input train are not passed, thus making it possible to employ as pulses alternate half waves of an alternate voltage, or to eliminate negative-going pulses (such as may occur in the output of a preceding counter stage). This rectifying action also prevents reaction from the counter stage to the preceding counter stage or other source of input signals. Thus, during the resetting flux change of the core, a negative-going voltage appears at the collector of transistor 7. This pulse is blocked and no current flows between the terminal 1 and ground since the base of transistor 7 is biased positive with respect to the emitter and collector. It will be appreciated that with the transistor 7 included as a buffer the cascading of counter stages is simplified, whether the buffer be considered as the input device of one stage or as the output device of the preceding stage.

The simplicity and versatility of the counter stage may be further appreciated by examination of the circuit components and values employed in manufacturing the exemplary construction of Figure 1. Both of the transistors are suitably a relatively inexpensive junction type, such as type 2N321, and the resetting voltage is simply a six volt battery. On a core made by spirally winding 50 wraps of one-quarter milli-inch tape of "4–79 Mo-Permalloy" on a bobbin one quarter inch wide with a one quarter inch diameter the turns may simply be one continuous winding in one direction (in this case No. 36 enamelled wire) with taps brought out to make the resetting connections as well as the input and output winding terminals. The following table is the winding chart for the core of Figure 3:

| Tap: | Turn No. |
|---|---|
| 10 (output) | Start |
| 11 (common) | 16 |
| 12 (emitter) | 48 |
| 13 (base) | 60 |
| 14a (2-count) | 40 |
| 14b (5-count) | 77 |
| 14c (10-count) | 131 |
| 14d (30-count) | 259 |

As may be seen the total number of input turns depends, for pulses of given volt-second content, upon the number of pulses to be counted before an output pulse is formed. The number of resetting turns required for the blocking oscillator and the number of output turns are not changed by the adjustment of the input winding turns to select the count. Only four taps, 14a, 14b, 14c and 14d are shown here for counts respectively of 2, 5, 10 and 30, but more can be added or the core can be wound specifically for a single predetermined count. Furthermore, since the turns all link the common core and the blocking oscillator circuit employing the switch device 5 requires no further isolation, the resetting taps 11, 12 and 13 share the turns of the input winding. However, if desired, a separate input winding connected to tap 11 may be used.

A modification of the count stage is shown in Figure 4, and bears the same reference numerals as in Figure 1 except for the input winding and the buffer transistor. The switching buffer 7 of Figure 1 is replaced by an amplifier-buffer transistor 18, to provide a power gain, utilizing as the amplifier power source the source 6 already required for resetting the core. To facilitate the additional use of the supply 6 a separate input winding between taps 19 and 20 is employed, although the resetting and output turns between taps 10, 11, 12 and 13 are employed as in Figure 1. The buffer is suitably a transistor 18 of the same type as in Figure 1 but connected as a grounded-emitter amplifier with the base connected to the input terminal 1 and the collector connected to terminal 19 of the input winding. Terminal 20 of the input winding is connected to the negative terminal of the voltage source 6, which, as before, has its positive terminal grounded. With zero bias voltage on the base 1, the transistor conducts only during negative-going input pulses, i.e., when the terminal 1 is driven negative with respect to terminal 2.

The input winding direction or taps are readily selected to saturate the core in the appropriate direction for the resetting and output winding operation. The advantage of the circuit of Figure 4 lies in the reduced power requirement of the input source, although change or replacement variation in the characteristic of the buffer transistor 18 is more critical than when it is employed as a switch.

The circuit of Figure 4 has been found particularly useful when employed with an alternating input voltage source, which may be of relatively high internal impedance, as a 1:1 ratio counter or pulse former. The input turns are selected to provide saturation during one input pulse. The effect of variations in signal amplitude or in transistor characteristics can be minimized by saturation within a minor fraction of the normal applied half-wave. The output pulses are of a given amplitude and duration product equal to the number of turns times twice the saturation flux of the saturable core device, and independent of the input power. Succeeding stages may safely employ higher counting ratios.

Figure 5 indicates by block diagram cascaded operation of the stages of Figure 1. Thus, as shown, the source of input signals 21 may suitably be a 1,000 cycles per second alternating voltage source. The first stage 22 has turns adjusted for a 1:1 ratio to convert alternating half waves appearing at its input terminal 1' to output pulses of given volt-second content at its output terminal 3'. The second and third stages 23 and 24 are respectively adjusted for 2:1 and 5:1 counts.

Figure 5B:
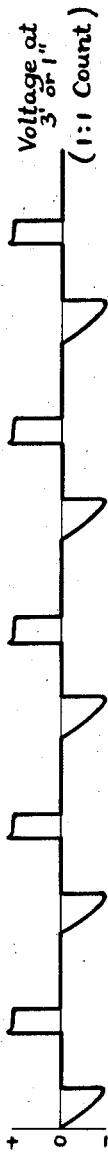

Figures 5a and 5b illustrate the pulse forming operation of the 1:1 stage. As shown in Figure 5a an alternating wave form is applied between terminals 1' and 2. The volt-second product of the initial part of each positive half wave is sufficient to saturate the core of the saturable device of counter 22. As shown in Figure 5a, the voltage then drops below the dotted-line no-load value to a lower level due to the internal impedance of the source while magnetizing current flows during the remainder of the half cycle. As shown in Figure 5b, the voltage at the output terminal 3' rises rapidly at the end of each positive half cycle current flow to form a positive output pulse of predetermined content. It will be noted that negative-going pulses appear as the inversion of the input voltage wave portion occurring before saturation in the output wave train. While this first counter stage could be employed at a ratio greater than unity, its functions as previously indicated are to provide a well-regulated source of voltage pulses of assured uniform content. The number of input turns is kept small enough to assure saturation during an early part of each positive half wave of the alternating input source, so that variations in the input wave amplitude or in its internal impedance are insufficient to affect the reliability of the 1:1 count.

Counter stage 23 is adjusted for a 2:1 counting ratio. The negative-going excursions of the applied signal of Figure 5b are blocked by the buffer transistor 7 of stage 23 and do not appear in the output voltage train at 3" shown in Figure 5c. Instead, during each input pulse to stage 23, there is a small negative-going output pulse of predetermined duration and at the second of each such negative output pulse, the positive pulse formed by the resetting flux appears.

Figure 5C:
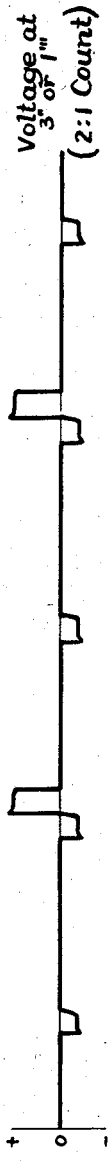
Figure 5D:
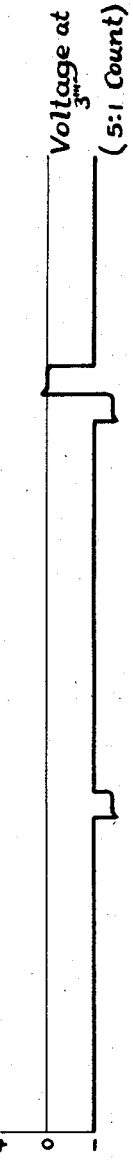

With the third stage 24 connected in cascade at a ratio of 5:1, the voltage train of Figure 5c appears at its input terminal 1''' and the output voltage appears at terminal 3''', as indicated in 5d. During each of five successive positive input pulses a small negative-going pulse of the same duration is formed followed immediately upon the termination of the fifth pulse by the positive or counting pulse. The operation thus illustrates a safe and reliable conversion of positive alternating half-waves at 1,000 cycles per second to uniform low impedance output pulses at a repetition rate of 100 per second.

Various other combinations may of course be employed, either as single stages or in cascade. The circuit of Figure 4 may of course be employed as the 1:1 pulse-former of stage 22 in Figure 5. Higher or lower frequencies may be employed, and the counts per stage may be increased greatly over the 2:1 or 5:1 ratios illustrated. With very high counting ratios however, there is the possibility that the $n$th pulse where the ratio or count is $n$ may not drive the core to saturation until the very end of the pulse, in which event resetting would be timed by the $n+1$ pulse. In addition, the time for resetting, limited by the time between input pulses, should not be so critically short as to require inconveniently high resetting voltages. It will be appreciated that the accuracy of the stage as a timing device does not in any way require a high count. Thus, for example, with a 1:1 count the fact that the core flux may reach the loop saturation level long before the input pulse itself is terminated does not affect the time of initiation nor the duration of the output pulse. Instead, the output pulse always occurs after the termination of the last pulse in the count since it is the cessation of the saturation current flow rather than the end of the relatively small magnetizing current flow which triggers the resetting action.

Reference may also be made to the cross section view of Figure 6 which illustrates, by way of example, the compactness available in equipment incorporating my invention. As shown therein the counting device 25 has its reactor 4, its transistors 5 and 7, and the associated resistors housed in the small envelope 26 and connected to pins of a base 27 such as used in miniature radio tubes. The various elements are suitably separated by insulating disc spacers 28 and the electrode leads to the base pins. With such a type of structure the counting stages may be easily installed or replaced on an equipment chassis having sockets with connections to the resetting battery and to preceding or succeeding counting stages.

It is obvious of course, that should N-P-N transistors be substituted for transistors having the polarity illustrated and described, the applied polarities would also have to be reversed. Likewise it is readily apparent that pulses which are negative-going with respect to a common terminal may be counted and formed and the positive-going pulses rejected as a matter of designer's choice.

I claim as my invention:

1. Apparatus for repetitively producing a uniform output-pulse upon a given input-pulse volt-second integration comprising a saturable reactor core having a substantially rectangular hysteresis loop and a rising magnetization characteristic beyond the loop saturation level, means linking said core connected to a source of input pulses to drive the core from a negative saturation state to a positive saturation state before the termination of the input pulse completing the integration, a switch having a pair of swiching electrodes and a control electrode to open or close the switch in selective response to the control potential value, a single source of direct current voltage, means linking said core connected in circuit with said direct current voltage source and said pair of switching electrodes to reset the core to negative saturation when the switch is closed, and means linking said core connected between said control electrode and one of said switching electrodes to provide an induced voltage to close the switch when the core flux drops upon termination of said input pulse completing the integration and during the following resetting of the core to negative saturation, and output means responsive to the resetting flux change of the core.

2. Apparatus for repetitively producing an output pulse in response to a given number of input pulses comprising a saturable core having a substantially rectangular hysteresis loop and a rising magnetization characteristic beyond the loop saturation level, a plurality of winding turns linking said core, means connecting certain of said turns as an input winding to a source of input pulses to drive the core flux between negative and positive saturation with said given number of pulses prior to the termination of the last pulse thereof in order to drive the core flux higher by the flow of saturation current, a sole source of direct current voltage, a switch having switch electrodes and a control electrode for opening or closing the switch in accordance with the control potential applied between said control electrode and one of said switch electrodes, means connecting certain of said turns to said direct current source through said switch electrodes as a resetting winding to reset the core when the switch is closed, means connecting said control electrode to the winding at a number of turns beyond the resetting winding turns for inducing a control potential for closing said switch during the flux drop following the termination of said last input pulse and continuing during the resetting of the core, and means connecting certain of said winding turns to output terminals for delivering the output pulse thereto induced by the flux change during resetting.

3. Apparatus for repetitively producing a uniform output pulse for each given volt-second integration of a number of input pulses comprising a saturable reactor core having a substantially rectangular hysteresis loop and a rising magnetization characteristic beyond the loop saturation level, means linking said core connected to a source of input pulses to drive the core from a negative saturation state to a positive saturation state before the termination of the last input pulse completing the integration to permit further magnetization beyond the loop saturation level, resetting means comprising a transistor having a pair of output electrodes and a control electrode, a single source of direct current voltage, an output circuit linking said core connected to said direct current voltage source through said output electrodes to reset the core to negative saturation when the conduction is not blocked, and a control circuit linking said core connected between said control electrode and one of said output electrodes polarized to apply a control potential for initiating conduction in said output circuit induced by the core flux drop upon termination of each said last input pulse and by the flux change in the same direction during resetting of the core to negative saturation, and an output circuit linking said core to output terminals to supply as said output pulses thereto the voltages induced by the resetting flux change.

4. Apparatus for forming an output pulse for each selected count of one or more input pulses comprising a saturable reactor core having a substantially rectangular hysteresis loop and a rising magnetization characteristic beyond the loop saturation level, an input winding on said core for connection to a source of input pulses having a number of turns selected to drive the core from a negative to a positive saturation level by pulse current flow during said count and further to drive the core beyond said saturation level by saturation current flow during part of the last pulse in said count, a junction transistor having a base, an emitter, and a collector, a single source of direct current voltage, means connecting the emitter, collector and said direct current voltage source in series across at least some of said winding turns for resetting the core to its negative saturation level when the emitter-collector conduction is not blocked, means connecting the base to said input winding to provide an induced unblocking potential between the emitter and the base during the core flux drop upon termination of said saturation current and further during resetting of the core to negative saturation, and an output circuit winding on said core for supplying output pulses induced by the resetting flux change.

5. Apparatus for forming an output pulse for each selected count of one or more input pulses comprising a saturable reactor core having a substantially rectangular hysteresis loop and a rising magnetization characteristic beyond the loop saturation level, an input winding linking said core connected to a source of input pulses to drive the core from a negative to a positive saturation level by the current flow during said count and beyond said level by saturation current flow during part of the last pulse in said count, a single transistor having a base, an emitter, and a collector connected as a blocking oscillator with input and output circuits thereof linking said core, a single source of direct current voltage, said output circuit including said source of direct current voltage for resetting the core to its negative saturation level during the time output current conduction is unblocked by an input circuit voltage induced by the core flux drop upon termination of said saturation current and during resettting of the core to negative saturation and an output winding on said core for supplying output pulses induced by the resetting flux change.

6. Apparatus for forming a square-wave output pulse having a predetermined volt-second product in response to each wave of an alternating input signal comprising a saturable core having a rectangular hysteresis loop with a rising magnetization characteristic beyond the loop saturation level, an input winding linking said core, a single direct current voltage source, a transistor amplifier for passing alternate half-waves of said signal having an input circuit connected to a source of said input signals and an output circuit including said D.C. voltage source connected to said input winding, said input winding having a number of turns chosen to drive the core from a reverse to a forward saturation state and further magnetize it with saturation current within the time duration of a single amplified half-wave, a resetting winding linking said core, a resetting transistor switch having its emitter and collector electrodes connected in series with said D.C. voltage source across a number of said resetting turns, said number being selected to reset the core within a half-wave interval when the switch is closed, means connecting said resetting transistor base electrode to the resetting winding at a number of turns beyond the said number of resetting winding turns to apply an induced voltage to the base for closing said switch during the flux change following the termination of an amplified half-wave and continuing during the resetting of the core, and an output winding linking said core connected to output terminals for delivering the square wave output pulse thereto induced by the resetting flux change.

7. Apparatus for forming an output pulse for each selected count of one or more input pulses comprising a saturable reactor core having a substantially rectangular hysteresis loop and a rising magnetization characteristic beyond the loop saturation level, a multiturn winding on said core a plurality of taps on said winding including a common input and output terminal, means for connecting a source of input pulses between said common terminal and an input tap with the turns therebetween selected to drive the core from a negative to a positive saturation level by pulse current flow during said count and further to drive the core beyond said level by saturation current flow during part of the last pulse in said count, a single resetting junction transistor having a base, an emitter, and a collector, a single direct current resetting voltage source connected between said common terminal and said collector, means connecting said emitter to a winding tap removed from the common tap by a number of turns selected to reset the core to its negative saturation level in the time interval between the end of said saturation current and the beginning of the next input pulse during emitter-collector conduction, means connecting the base to another winding tap further removed by a further number of turns from the common tap to apply the control voltage induced by the core flux drop upon termination of said saturation current flow and during resetting of the core for unblocking emitter-collection conduction, and means for connecting said common terminal and a further tap as output terminals for supplying output pulses induced by the resetting flux change.

8. Apparatus for forming an output pulse for each selected count of one or more input pulses of given polarity comprising a saturable reactor core having a substantially rectangular hysteresis loop and a rising magnetization characteristic beyond the loop saturation level, an input circuit comprising a source of input pulses coupled to said core for driving the core from a negative to a positive saturation level by pulse current flow during said count and further to drive the core beyond said level by saturation current flow during part of the last pulse in said count and a first transistor switch connected in series with said source to block current flow opposite that of the pulses of given polarity, a resetting blocking oscillator circuit comprising a second transistor having input and output circuits connected between the electrodes thereof with one electrode common to each circuit, a single direct current resetting voltage source, said output circuit being coupled to said core and including said resetting voltage source, said input circuit being coupled to said core exclusive of said voltage source to provide an unblocking induced control voltage for initiating conduction in said output circuit during the core flux drop upon termination of said saturation current and the resetting flux change itself, and an output circuit coupled to said core for providing output pulses of given polarity induced by the change in core flux during resetting.

9. Apparatus for forming an output pulse for each selected count of one or more input pulses of given polarity comprising a saturable reactor core having a substantially rectangular hysteresis loop and a rising magnetization characteristic beyond the loop saturation level, a multiturn winding on said core having a plurality of taps, an input circuit comprising a source of input pulses connected between first and second taps on said winding with the number of the turns therebetween selected to drive the core from a negative to a positive saturation level by pulse current flow during said count and further to drive the core beyond said level by saturation current flow during part of the last pulse in said count, a first transistor in said input circuit having its base electrode connected to said first tap and its emitter and collector electrodes connected in series between said source and said second tap, a second transistor, a source of direct current resetting voltage connected between said first tap and a third tap through the collector and emitter electrodes of said second transistor for resetting the core to its negative saturation level in the time interval between the end of said saturation current and the beginning of the next input pulse during emitter-collector conduction, means connecting the base electrode of said second transistor to a fourth tap for blocking said emitter-collector conduction except during resetting of the core following a core flux drop upon termination of said saturation current, and means connecting the winding turns between said first tap and another tap to output terminals for providing output pulses induced by the resetting flux change.

10. Appaartus for forming an output pulse for each selected count of one or more input pulses comprising a saturable reactor core having a substantially rectangular hysteresis loop and a rising magnetization characteristic beyond the loop saturation level, an input winding having winding turns linking said core to a source of input pulses to drive the core from a negative to a positive saturation level by magnetizing current flow during said count and beyond said level by saturation current flow during part of the last pulse in said count, a single transistor having a base, an emitter, and a collector connected as a blocking oscillator with input and output circuits thereof each including winding turns linking said core, a single source of direct current voltage, said output circuit including said source for resetting the core to its negative saturation level during the time output current conduction is unblocked by the input circuit voltage induced by the core flux drop upon termination of said saturation current and during resetting of the core to negative saturation, a resistor shunting at least some of said winding turns linking said core to damp input circuit voltages induced by the core flux drop upon termination of magnetizing current flow below the level of saturation current, and an output winding turning linking said core for supplying output pulses induced by the resetting flux change.

11. Apparatus for forming an output pulse for each selected count of one or more input pulses comprising a saturable reactor core having a substantially rectangular hysteresis loop and a rising magnetization characteristic beyond the loop saturation level, a multiple turn winding on said core including a plurality of taps having numbers of turns between them, means for applying input pulses between selected input taps having the number of turns between them for driving the core from a negative to a positive saturation level by pulse current flow during the number of pulses in said selected count and further to drive the core beyond said saturation level by saturation current flow during a portion of the last pulse in said count, a switching circuit comprising junction transistor having first, second, and, third electrodes, a single source of direct current voltage, means connecting said first electrode to an intermediate winding tap, means connecting said second electrode in series with said source to a tap removed in turning in one winding direction with respect to said intermediate tap, for resetting the core to its negative saturation level when resetting conduction between said first and second electrodes is not blocked, means connecting the third electrode to a tap removed in turns in the other winding direction from said intermediate tap to apply an induced resetting current unblocking potential between the first and third electrodes during the core flux drop upon termination of said saturation current and further during resetting of the core to negative saturation, and an output circuit winding on said core for supplying output pulses induced by the resetting flux change.

References Cited in the file of this patent

UNITED STATES PATENTS

| | | |
|---|---|---|
| 2,824,697 | Pittman et al. | Feb. 25, 1958 |
| 2,824,698 | Van Nice et al. | Feb. 25, 1958 |